(No Model.)
E. P. VOISARD.
ACETYLENE GAS GENERATOR.
No. 576,386. Patented Feb. 2, 1897.
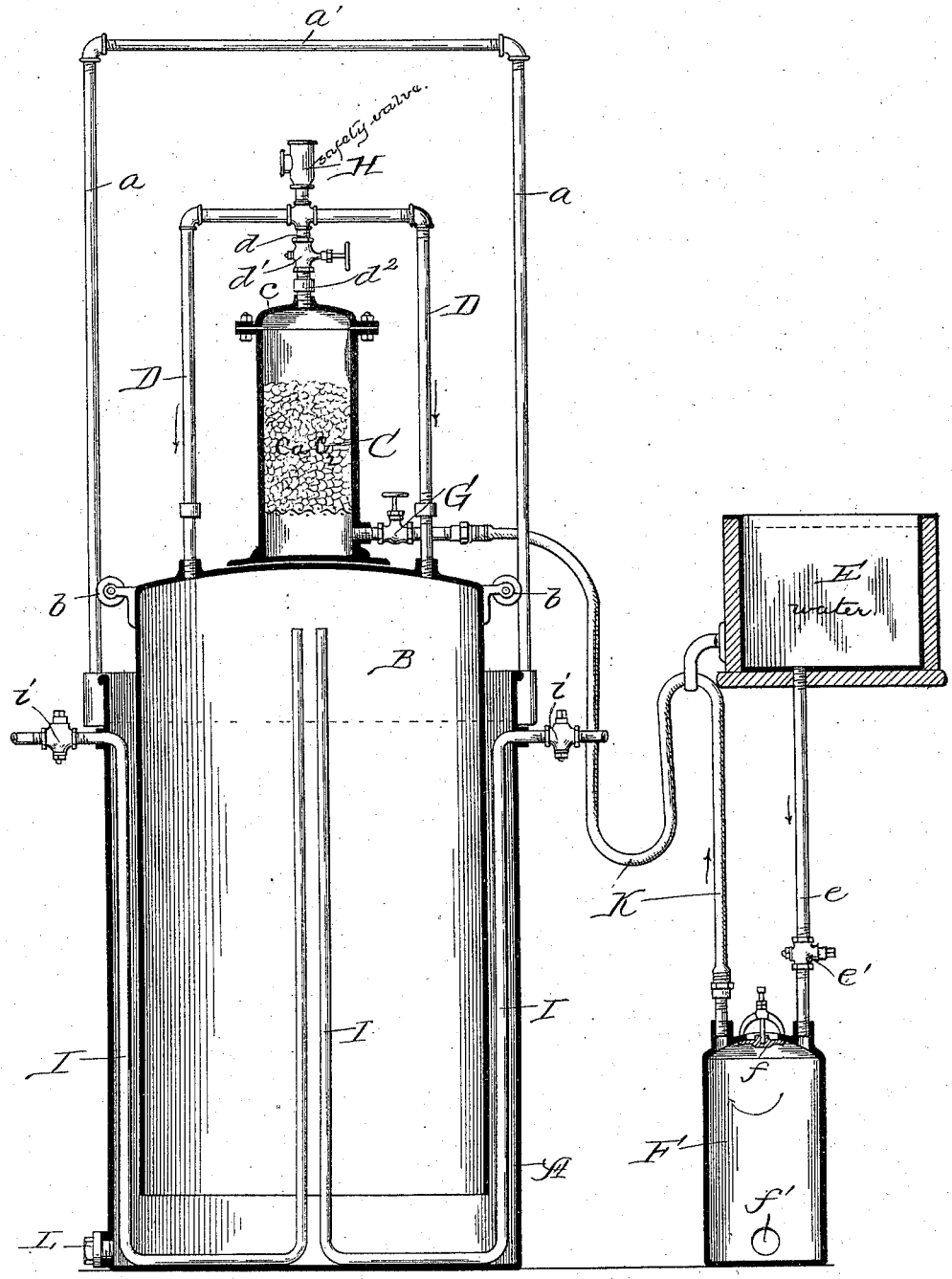
Witnesses:
Chas. E. Gaylord,
Lute F. Fite
Inventor:
Emile P. Voisard,
By Banning & Banning & Sheridan,
Att'ys

UNITED STATES PATENT OFFICE.

EMILE P. VOISARD, OF CHICAGO, ILLINOIS.

ACETYLENE-GAS GENERATOR.

SPECIFICATION forming part of Letters Patent No. 576,386, dated February 2, 1897.

Application filed September 15, 1896. Serial No. 605,867. (No model.)

*To all whom it may concern:*

Be it known that I, EMILE P. VOISARD, a citizen of the United States, residing at Chicago, Illinois, have invented a new and useful Improvement in Acetylene-Gas Generators, of which the following is a specification.

The object of my invention is to provide for generating acetylene gas in a simple and economical way; and the invention consists in the features and combinations hereinafter described and claimed.

In the accompanying drawing, which is a vertical section of my improved acetylene-gas generator, A is the outside gasometer water-tank, $a$ bars extending upwardly therefrom, and $a'$ a cross-bar connecting the bars; B, the gas-holder, and $b$ rollers, pulleys, or sheaves adapted to move up or down the sliding bars; C, the generator holding the carbid of calcium, and $c$ the cover thereof; D, pipes for conducting the gas into the gas-holder, $d$ a downward extension thereof, $d'$ a shut-off in the downward extension, and $d^2$ a coupling connecting the downward extension with the generator; E, the water-supply tank, $e$ a pipe extending downwardly therefrom, and $e'$ a shut-off in such pipe; F, a receptacle for calcium residue, $f$ an opening therein, and $f'$ an outlet for removing the residue or letting out water; G, a coupling connecting the residue-tank to the generator; H, a safety-valve at the top of the gas-pipes communicating with the gas-holder; I, gas-outlet pipes, and $i$ couplings for connecting the supply-pipes thereto; K, flexible tubes leading from the residue-tank to the generator, and L an outlet for emptying the tank.

As it will be seen, the gas-holder floats inside the gasometer water-tank in the usual way, and the generator is above the gas-holder and preferably removable therefrom. Whenever it is desired to charge the generator with carbid of calcium, it is uncoupled from its connections with the water-supply tank and gas-pipes D, its cover removed, and the proper charge introduced. The cover is then tightly replaced, the generator put back into its position, and the water and gas pipes coupled or connected to it.

The water-supply tank communicates with the receptacle for the residue, and this receptacle communicates with the generator by means of flexible tubes. A sufficient quantity of water is introduced into the water-supply tank to establish a water-level in the generator, and water thus introduced comes in contact with the calcium in the generator. This contact of the water with the calcium immediately generates gas and causes the gas-holder to rise, and this rising causes the water and slime to flow back into the receptacle for calcium residue. The gas thus generated passes from the generator into the pipes and to the gas-holder, from which it may be readily drawn for use as desired, and this drawing off of the gas causes the gas-holder to descend until the normal water-level is again reached, when gas is again instantly generated and the operation repeated. If for any reason the gas-holder should rise too high, the safety-valve at the top of the gas-pipes would come in contact with the cross-bar connecting the bars, letting off the surplus gas through a flexible pipe, (not shown,) and thus avoiding all danger from the escape of gas.

As will be seen, the foregoing apparatus is automatic and does not require to be looked after or to have water turned on whenever it is desired to generate gas. In some cases, however, where an automatic apparatus is not desired the generator may be removed and the receptacle for calcium residue used as a generator. In such case the flexible pipe leading from the receptacle may be connected directly to the downward extension of gas-pipes D or at one of the gas-outlets. In operation the proper quantity of calcium carbid is introduced into the receptacle for calcium residue, its cover being screwed tightly in place and the proper proportion of water introduced. This causes gas to generate, as above described, and such gas passing up into the pipes through the flexible tube causes the gas-holder to rise, as above described. The gas-holder becoming full inflow of gas may be shut off by the cock $d'$ and the flexible tube disconnected or not, as desired.

I claim—

In combination with a gasometer water-tank and gas-holder, a removable generator placed above the gas-holder adapted to receive and hold carbid of calcium, gas-pipes communicating with the generator, a water-supply tank, a calcium-residue receptacle, means for introducing water from the water-supply tank into the calcium-residue receptacle, and means for introducing water from the calcium-residue receptacle into the generator in contact with the carbid of calcium, substantially as described.

EMILE P. VOISARD.

Witnesses:
 EPHRAIM BANNING,
 THOMAS B. MCGREGOR.